(12) United States Patent
Nafziger et al.

(10) Patent No.: US 8,733,770 B2
(45) Date of Patent: May 27, 2014

(54) STEERABLE REAR AXLE SYSTEM FOR DUAL-PATH STEERED WINDROWER TRACTOR

(71) Applicant: AGCO Corporation, Duluth, GA (US)

(72) Inventors: Brendon Nafziger, Canton, KS (US);
Martin E. Pruitt, Hesston, KS (US);
Douglas Treffer, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/720,082

(22) Filed: Dec. 19, 2012

(65) Prior Publication Data

US 2013/0154222 A1 Jun. 20, 2013

Related U.S. Application Data

(60) Provisional application No. 61/577,321, filed on Dec. 19, 2011.

(51) Int. Cl.
*B62D 7/00* (2006.01)

(52) U.S. Cl.
USPC .................................................. 280/93.502

(58) Field of Classification Search
USPC ............ 280/93.502, 87.2; 180/420, 417, 412, 180/418, 438, 443, 444, 445, 6.2, 6.24, 180/6.26, 6.28, 6.3, 6.32, 6.48
See application file for complete search history.

(56) References Cited

U.S. PATENT DOCUMENTS

| | | | | |
|---|---|---|---|---|
| 3,075,233 | A * | 1/1963 | Lorenz | 16/35 R |
| 4,349,938 | A * | 9/1982 | Fontana | 16/35 R |
| 5,221,100 | A * | 6/1993 | McNutt | 280/78 |
| 6,668,965 | B2 * | 12/2003 | Strong | 180/411 |
| 7,077,220 | B2 * | 7/2006 | Dunn et al. | 180/6.2 |
| 7,159,687 | B2 | 1/2007 | Otto | |
| 7,306,062 | B2 | 12/2007 | Dunn | |
| 7,918,304 | B2 | 4/2011 | Perry et al. | |
| 8,353,377 | B2 * | 1/2013 | Geiger et al. | 180/209 |
| 8,496,256 | B2 * | 7/2013 | Bebernes et al. | 280/86 |
| 2005/0115746 | A1 * | 6/2005 | Dunn et al. | 180/6.2 |
| 2008/0184687 | A1 * | 8/2008 | Scherbring et al. | 56/10.1 |
| 2009/0152828 | A1 | 6/2009 | Bebernes et al. | |

* cited by examiner

*Primary Examiner* — Drew Brown

(57) ABSTRACT

A working vehicle has a castor wheel assembly selectively providing steering assist. A pivoting caster spindle coupled with a caster wheel and an engagement plate connected to the caster spindle in a fixed manner such that the engagement plate pivots with the caster spindle. A pivoting steering arm is rotatably connected to the caster spindle and a steering cylinder is connected to an outward end of the steering arm with a tie rod configured to pivot the steering arm. A keyed connecting mechanism selectively couples the steering arm with the engagement plate. In an engaged position, the keyed connecting mechanism couples the steering arm with the engagement plate such that the steering cylinder pivots the caster spindle and caster wheel. In a disengaged position, the steering arm is uncoupled with the engagement plate such that the caster spindle and caster wheel are free to pivot independent of the steering cylinder.

3 Claims, 2 Drawing Sheets

STEERABLE REAR AXLE SYSTEM FOR DUAL-PATH STEERED WINDROWER TRACTOR

CROSS REFERENCE TO RELATED APPLICATIONS

This application claims priority to U.S. Provisional Application No. 61/577,321 filed Dec. 19, 2011, entitled "STEERABLE REAR AXLE SYSTEM FOR DUAL-PATH STEERED WINDROWER TRACTOR".

BACKGROUND OF THE INVENTION

1. Field of Invention

This invention relates to work machines, and, more particularly, to a steering assist arrangement for steering such work machines.

2. Description of Related Art

Self-propelled work machines such as windrowers are typically driven through a dual-path hydrostatic steering system. Speed changes are made by adjusting the speed of both drive wheels simultaneously. Direction changes are made by adjusting the relative speed of the drive wheels. Typically the non-drive wheels of the machine are castered to allow the machine to pivot during direction changes. The caster wheels are carried by the machine frame and are free to rotate 360 degrees about a generally vertical axis. The caster wheel assembly typically includes a shaft defining an axis of rotation, a wheel arm rigidly attached to the bottom end of the shaft, and a caster wheel coupled with the distal end of the wheel arm.

Steering characteristics of dual-path steering systems are dependent on such things as steering linkages, hydrostatic pump reaction time, the machine's turning inertia, and caster turn resistance. Turn resistance of the caster wheels results from friction in the pivot of the caster assembly and friction between the castered wheels and the ground. If the turn resistance is high enough to produce a noticeable delay in the reaction to the steering wheel input, control of the machine can be difficult. There is a tendency for a steering input to have a slow reaction or understeer at initiation, then a tendency to keep turning or oversteer when the input is stopped or reversed.

Because of this, control of the machine can be difficult, particularly at higher speeds. Windrowers typically have a maximum speed in transport in the 15 miles per hour (mph) range. Transport speeds up to 25 mph would be an advantage in the market. This requires better machine controllability at higher speeds without sacrificing the agility of the current system at lower speeds. Reaction delay can be particularly pronounced if the machine is operated without the cutting header because the added weight on the casters results in increased turn resistance.

What is needed is a steering assist arrangement for a work machine providing steering assist for the rear caster wheels to assist the dual path steering during certain operations when improved steering response is desired and with the versatility to accommodate tight space restrictions.

OVERVIEW OF THE INVENTION

In one embodiment, the invention is directed a working vehicle having a pair of drive wheels for dual path steering and at least one caster wheel being part of a castor wheel assembly selectively providing steering assist to the working vehicle. The caster wheel assembly includes a pivoting caster spindle coupled with a caster wheel and an engagement plate connected to the caster spindle in a fixed manner such that the engagement plate pivots with the caster spindle. A pivoting steering arm is rotatably connected to the caster spindle and a steering cylinder is connected to an outward end of the steering arm with a tie rod configured to pivot the steering arm. A keyed connecting mechanism selectively couples the steering arm with the engagement plate. The keyed connecting mechanism has an engaged position and a disengaged position, wherein in the engaged position the keyed connecting mechanism couples the steering arm with the engagement plate such that the steering cylinder pivots the caster spindle and caster wheel. In the disengaged position, the steering arm is uncoupled with the engagement plate such that the caster spindle and caster wheel are free to pivot independent of the steering cylinder.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
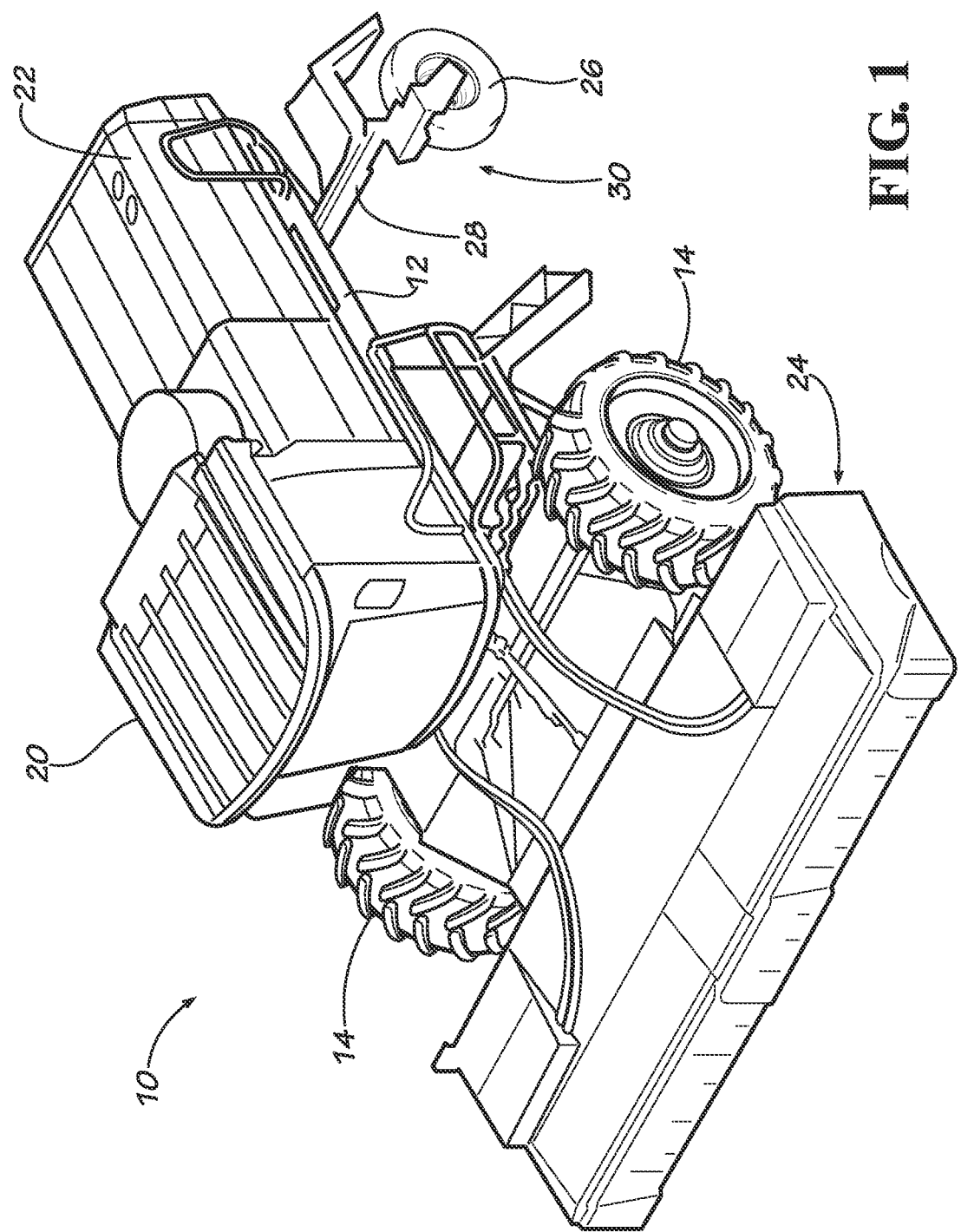
FIG. 1 is a perspective view of a work machine incorporating an embodiment of a caster wheel assembly having a steering assist arrangement of the present invention.

Referring now to the drawings, and more particularly to FIG. 1, there is shown a self-propelled windrower 10 using one or more caster wheels operable to mow and collect standing crop in the field, condition the cut material as it moves through the machine to improve its drying characteristics, and then return the conditioned material to the field in a windrow or swath. Although the invention will be described using a self-propelled windrower, one skilled in the art will understand that any self-propelled or pull-type working vehicle such as rotary mowers or combine having caster wheels may utilize the invention disclosed herein. The windrower 10 may include a chassis or frame 12 supported by drive wheels 14 for front dual path steering for movement across a field to be harvested as is known in the art. The frame 12 carries a cab 20, within which an operator controls operation of the windrower 10, and a rearwardly spaced engine compartment 22 housing a power source (not shown) such as an internal combustion engine. A harvesting header 24 is typically detachably mounted at the front end of the machine below the operator's cab in a manner understood by those skilled in the art. The engine compartment 22 is typically mounted behind the operator's cab 20 and above a pair of caster wheels 26. The machine frame 12 includes a tie rod 28 connected to each caster wheel 26 as will be described below.

Figure 2:
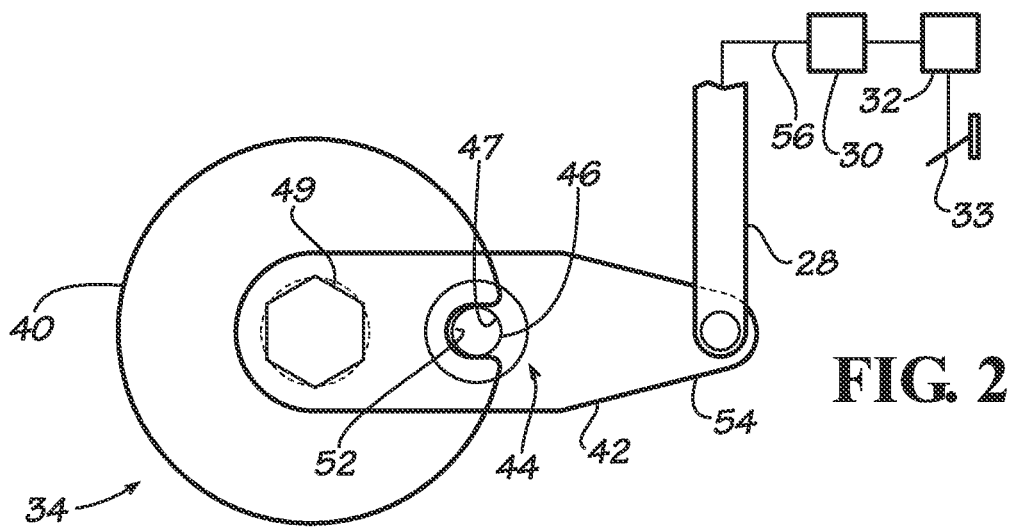
FIG. 2 is a top view of the caster wheel assembly of the work machine of FIG. 1.

The windrower 10 varies the speeds of the drive wheels 14 to provide a differential action that matches the requested turning radius as is known in the art. However, according to the invention, the windrower 10 has at least two modes of operation. In a standard field mode, the windrower 10 is steered in a conventional dual-path manner including counter-rotation abilities in which the caster wheels 26 are free to rotate 360 degrees independent of the tie rod 28. In a high-speed mode, both caster wheels 26 are coupled to the tie rod 28 and the tie rod 28 provides a steering input to the caster wheels 26. Turning now to FIG. 2, movement of the tie rod 28 is controlled by a steering cylinder 30. An electronic steering module 32 controls the position of the steering cylinder 30. When operating in this mode, a steering input device 33 located in the cab 20 (FIG. 1), such as a steering wheel, provides input to the steering module 32, and thus the position of the caster wheels 26. The windrower 10 may use any means to control the position of the steering cylinder 30 with the electronic steering module 32, such as by using proportional valves or any other conventional means known to one skilled in the art and using sound engineering judgment. Thus, according to the invention, each castor wheel 26 is part of a castor wheel assembly 34 that can be provided with steering assist in desired modes of operation to assist with the front dual path steering of the drive wheels 14 of the windrower 10. The windrower 10 may also have combination modes in which the machine could switch from low-speed to high-speed modes and back again based on certain threshold ground speeds.

Figure 3:
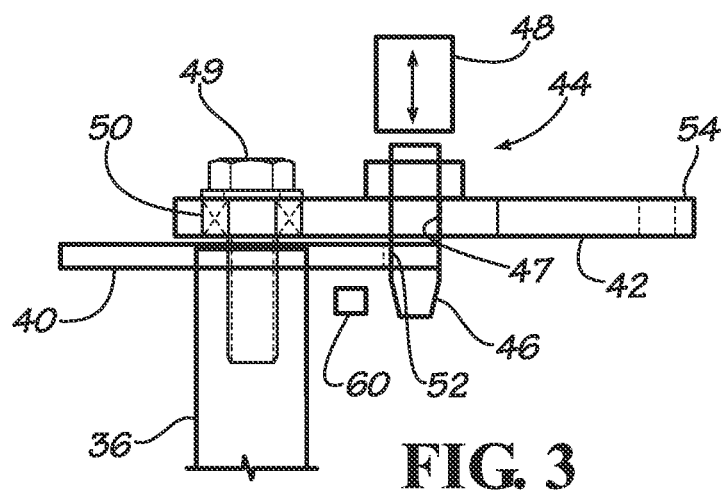
FIG. 3 is a side view of the caster wheel assembly of FIG. 2 in an engaged condition.
Figure 4:
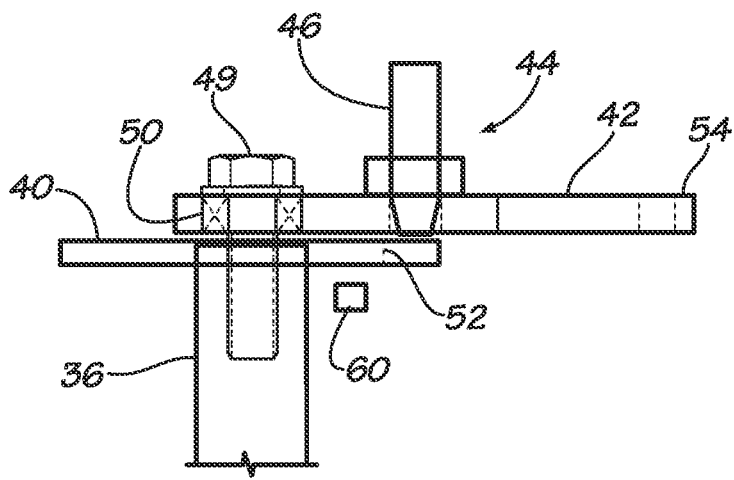
FIG. 4 is a side view of the caster wheel assembly of FIG. 2 in a disengaged condition.

Turning also now to FIGS. 3 and 4, there is shown one caster wheel assembly 34 incorporating an embodiment of a steering assist arrangement of the present invention. Only one caster wheel assembly 34 is shown in FIGS. 2-4 for simplicity, the other caster wheel assembly being configured substantially identical in the illustrated embodiment. Each caster wheel assembly 34 includes a caster spindle 36 coupled to the caster wheel 26 (FIG. 1). The caster spindle 36 is rotatably carried or otherwise affixed to the frame 12 through any known means such that the caster wheel 26 can rotate 360 degrees with respect to the frame. The caster spindle 36 may include a fork with distal ends on opposite sides of the caster wheel 26 for mounting the wheel 26 in known fashion or may be configured as a single arm which curves around to the side of the caster wheel 26 without departing from the scope of the invention. An engagement plate 40 is connected to the caster spindle 36 in a fixed manner such that the engagement plate 40 rotates with the caster spindle 36.

A steering arm 42 is selectively engagable with the engagement plate 40 associated with each caster wheel 26 with a keyed connecting mechanism 44. In one embodiment, the keyed connecting mechanism 44 includes an engagement pin 46 passing through an aperture 47 in the steering arm 42. The engagement pin 46 is moveable between a first position as shown in FIG. 3 in which the engagement pin 46 extends through the steering arm 42 a sufficient distance to engage the engagement plate 40 and a second position as shown in FIG. 4 in which the engagement pin 46 retracts away from the engagement plate 40. A pin actuation device 48 is configured to cause the engagement pin 46 to move relative the steering arm 42 and the engagement plate 40 between the engaged position that rotatably locks the engagement plate 40 to the steering arm 42 and the disengaged position in which the engagement plate 40 can freely rotate with respect to the steering arm 42. In one embodiment, the steering arm 42 is connected to the caster spindle 36 with a threaded bolt 49 and suitable bearing 50 such that the caster spindle 36 rotates freely with respect to the steering arm 42 when the keyed connecting mechanism 44 is in the disengaged condition.

In one embodiment, the engagement plate 40 has a recess 52 formed in its outer circumference that is configured to receive the engagement pin 46. With the engagement pin 46 received in the recess 52, the steering arm 42 and engagement plate 40 are locked together and pivoting motion of the steering arm 42 is transferred to the engagement plate 40. The recess 52 is positioned in the outer circumference of the engagement plate 40 such that the engagement pin 46 only meshes with the recess 52 when the engagement plate 40, and thus the connected castor wheel 26, and the steering arm 42, and thus the tie rod 28 and steering cylinder 30, are in the forward straight position. Thus the keyed connecting mechanism 44 operates such that if the high speed mode is activated without the caster spindle 36 being properly lined up, it would allow free rotation of the caster wheel 26 until the engagement plate 40 and steering arm 42 are aligned, at which point the keyed connecting mechanism 44 engages. However, other keying arrangements that require a specific orientation of the engagement plate 40 and the steering arm 42 in order for the components to mesh and engage may be used without departing from the scope of the invention. The steering arm 42 extends radially outward from the engagement plate 40 with the length of steering arm 42 being selected based upon the desired amount of steering assist force, etc.

The outward end 54 of the steering arm 42 is connected to the tie rod 28 and controlled by the steering cylinder 30. The steering cylinder 30 may be in the form of a two-way cylinder coupled with the tie rod 28 with a linkage 56. Linkage 56 may be of any suitable design, such as a ball linkage, using sound engineering judgment. In one embodiment, the steering cylinder 30 may have a suitable linear variable differential transformer (LVDT) and is controlled by software and feedback from the LVDT as is known in the art.

Engagement and disengagement of the steering arm 42 with the engagement plate 40 occurs by lifting or lowering the engagement pin 46 relative the engagement plate 40 using the pin actuation device 48. The pin actuation device 48 may be a suitable electric solenoid, hydraulic cylinder, or other positioning device known to one skilled in the art. A sensor 60 to confirm the engagement/disengagement of the engagement pin 46 with the engagement plate 40 is desirably provided. The sensor 60 permits warning the software and the operator if one caster wheel assembly 34 does not properly engage/disengage. The sensor 60 may be any known position sensor known to those skilled in the art.

Thus, when the steering arm 42 is locked with the engagement plate 40 as shown in FIG. 3, the steering cylinder 30 pivots the caster spindle 36 and caster wheel 26 to assist with the front dual path steering of the drive wheels 14 of the windrower 10 for operator commanded turns during higher speed transport or when the header 24 is removed from the windrower 10 for improved steering response. With the steering arm 42 in the disengaged condition as shown in FIG. 4, the caster spindle 36 and engagement plate 40 pivot freely of the steering arm 42. This allows the caster wheel 26 to pivot freely such as for lower speed field operations.

Desirably, the windrower 10 is configured with a single steering cylinder 30 coupled between frame 12 and tie rod 28 to control the positioning of the two caster wheel assemblies 34. However, the windrower 10 may includes a pair of steering cylinders 30, with each steering cylinder 30 being coupled between frame 12 and a corresponding caster wheel assembly 34.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A working vehicle having a pair of drive wheels for dual path steering and at least one caster wheel being part of a castor wheel assembly selectively providing steering assist to drive wheels, the caster wheel assembly comprising:
   a pivoting caster spindle coupled with a caster wheel;
   an engagement plate connected to the caster spindle in a fixed manner such that the engagement plate pivots with the caster spindle;
   a pivoting steering arm rotatably connected to the caster spindle;
   a steering cylinder connected to an outward end of the steering arm with a tie rod configured to pivot the steering arm; and
   a keyed connecting mechanism for engaging the steering arm with the engagement plate, the keyed connecting mechanism having an engaged position and a disengaged position, wherein in the engaged position the keyed connecting mechanism couples the steering arm with the engagement plate such that the steering cylinder pivots the caster spindle and caster wheel, and in the disengaged position, the steering arm is uncoupled with the engagement plate such that the caster spindle and caster wheel are free to pivot independent of the steering cylinder.

2. The working vehicle of claim 1 further comprising a connecting mechanism actuation device acting upon the keyed connecting mechanism and configured to move the keyed connecting mechanism between the engaged position and the disengaged position.

3. The working vehicle of claim 1 wherein the keyed connecting mechanism, the engagement plate and the steering arm mesh in a keyed arrangement such that the engagement plate and steering arm may only be coupled in a certain orientation of the engagement plate relative the steering arm.

* * * * *